United States Patent [19]

Holly, III

[11] Patent Number: 4,853,577
[45] Date of Patent: Aug. 1, 1989

[54] SEMI-RIGID SPACER FOR DIAMOND AREA OF DYNAMOELECTRIC MACHINE

[75] Inventor: Henry M. Holly, III, Winter Park, Fla.

[73] Assignee: Westinghouse Electric Corp., Pittsburgh, Pa.

[21] Appl. No.: 160,472

[22] Filed: Feb. 25, 1988

[51] Int. Cl.[4] .............................................. H02K 3/50
[52] U.S. Cl. ..................................... 340/260; 310/45; 310/65
[58] Field of Search ...................... 310/43, 64, 65, 260, 310/270, 271, 45; 29/598

[56] References Cited

U.S. PATENT DOCUMENTS

| | | | |
|---|---|---|---|
| 2,677,067 | 4/1954 | Johnson et al. | 310/260 |
| 2,844,746 | 7/1958 | Coggeshall | 310/65 |
| 3,075,112 | 1/1963 | Anderson et al. | 310/260 |
| 3,942,057 | 3/1976 | Philofsky et al. | 310/260 |
| 3,949,256 | 4/1976 | Cooper et al. | 310/260 |
| 3,949,257 | 4/1976 | Cooper et al. | 310/260 |
| 4,379,243 | 12/1984 | Dailey et al. | 310/260 |
| 4,488,079 | 12/1984 | Dailey et al. | 310/260 |
| 4,563,607 | 1/1986 | Cooper et al. | 310/260 |
| 4,710,662 | 12/1987 | Balke et al. | 310/43 |

FOREIGN PATENT DOCUMENTS

| | | |
|---|---|---|
| 1788142 | 5/1973 | Fed. Rep. of Germany . |
| 2231292 | 1/1974 | Fed. Rep. of Germany . |
| 2150163 | 9/1979 | Fed. Rep. of Germany . |
| 1343992 | 8/1963 | France . |
| 0347571 | 8/1960 | Switzerland . |
| 832100 | 4/1960 | United Kingdom ................ 310/270 |
| 1021407 | 3/1966 | United Kingdom ................ 310/260 |

*Primary Examiner*—Patrick R. Salce
*Assistant Examiner*—D. L. Rebsch
*Attorney, Agent, or Firm*—D. C. Abeles

[57] ABSTRACT

A filler material for supporting the coil end portions at the diamond area of a dynamoelectric machine comprises a resin filler disposed in the vent areas defined between opposed sides of spaced coil end portions at the diamond area, and an elongated, transversely corrugated, longitudinally flexible, sheet-like spacer element disposed within the filler at each vent area. The spacer element is positioned to extend along the respective vent area, with opposite faces thereof facing the sides of the coil end portions on either side of the vent area. The spacer element has a sufficient surface area in contact with the filler as a result of the corrugations of the spacer element, to retard sagging of the filler during installation and curing. The corrugations of the spacer element are generally rectangular in shape so that the element comprises a series of panels disposed in general parallelism to the sides of the corresponding coil end portions.

15 Claims, 3 Drawing Sheets

4,853,577

SEMI-RIGID SPACER FOR DIAMOND AREA OF DYNAMOELECTRIC MACHINE

BACKGROUND OF THE INVENTION

1. Field of the Invention

The present invention relates to end turn support arrangements for dynamoelectric machines and in particular to a novel filler material for supporting the coil end portions at the diamond area of a dynamoelectric machine.

2. Description of the Prior Art

In the dynamoelectric machine art there continues to be a need for improving the support arrangements for the end turn portions of the winding coils extending from the ends of the stators of dynamoelectric machines such as large turbine generators. Manifestly, the stresses imposed during operation, particularly those caused by vibration, result in wear of coil insulation and fatigue cracking in series and copper strand phase connections. Many proposals have been made in the past in an effort to solve these long standing problems an examples of prior art arrangements are illustrated in U.S. Pat. Nos. 3,949,256, 3,949,257, 4,379,243 and 4,488,079, the entireties of the disclosures of which are hereby specifically incorporated herein by reference. Other proposals have included packing the entire end turn area with a thixotropic, curable potting resin such as an epoxy, a polyester or polyurethane material.

More recently, the problems inherent in the prior art have been addressed by a support arrangement for the diamond area of a dynamoelectric machine which includes spacer blocks disposed within a resin filler and which have a specific volume and coefficient of thermal expansion to prevent excessive build up of temperature during curing of the resin and decrease the overall coefficient of thermal expansion of the filler material and adjust the thermal expansion characteristics thereof so that the latter more closely matches the thermal expansion characteristics of the coils. Such development is disclosed and claimed in commonly assigned, co-pending application Ser. No. 091,223 filed Aug. 31, 1987.

The subject matter of the foregoing application addresses a number of problems which are encountered when using resin fillers. Among such problems is that fillers, and in particular the epoxy resins which have the best mechanical properties for the application, generally have a coefficient of thermal expansion which appears to be approximately 4 times as great as the apparent coefficient of thermal expansion of the end turns themselves. As set forth in said prior application, the entirety of the disclosure of which is hereby specifically incorporated by reference, the coefficients of thermal expansion of the various components of the end turn arrangements of dynamoelectric machines are difficult to calculate with any mathematical exactitude, but the general result of a significant mismatch between the coefficients of the filler material and of the end turn windings is often a debonding of the resin filler from the windings.

Another problem addressed by said prior application is that when potting resin type materials are used, the curing reaction is generally highly exothermic, and when the volume of the curing material is too great, hot spots sufficient to actually destroy the resin may develop internally.

Another problem encountered when resin fillers are used, is that during the initial installation of the end turn filler material, the same is injected into the end turn area in a generally liquid state. Although the viscosity and thixotropy of the resin may be controlled to some degree by methodology which is presently known, the resin still tends to sag under its own weight and drip out of the winding area during cure. Moreover, even after curing the cured resins may have semi-rigid characteristics which sometimes allow internal flexing and independent vibration.

The present invention is aimed at the provision of a novel semi-rigid spacer for the diamond area of the dynamoelectric machine which addresses many of the problems encountered when using prior art resin fillers. In particular the invention provides means and a method which facilitate the holding of the resin in place after injection and during the curing stage. The present invention also provides means for increasing the effective stiffness of the filler material and controlling the linear thermal coefficient expansion of the filler resin.

SUMMARY OF THE INVENTION

To alleviate the prior art problems as discussed above, the present invention provides an arrangement for supporting the coil end portions at the diamond area of a dynamoelectric machine equipped with a stator having top and bottom winding coil end portions extending outwardly from the stator at each end thereof. The arrangement provides a filler material comprising a resin filler disposed in the vent areas defined between opposed sides of the spaced coil end portions of the diamond area, and an elongated, transversely corrugated, longitudinally flexible, sheet-like spacer element disposed within said filler at each vent area and positioned to extend along the respective vent area with the opposite faces thereof disposed in generally facing relationship to the sides of the coil end portions on either side of the vent area. The spacer element has a sufficient surface area in contact with the filler to inhibit sagging of the filler during curing. And the spacer element is operable to increase the effective stiffness of the filler material and control the linear thermal coefficient of expansion thereof after curing. In accordance with a more specific preferred aspect of the invention, the corrugations of the sheet-like spacer element are generally rectangular in shape and may be essentially square. In this latter regard, the spacer element preferably comprises a series of panels disposed in general parallelism to the sides of the corresponding coil end portions, such panels being alternatively arranged adjacent one of said sides and then the other and being interconnected by webs extending across the vent area.

In a particularly preferred aspect of the invention, the resin filler comprises an epoxy resin and the spacer element is constructed of a molded, unidirectional fiberglass material.

The invention also is directed to a method of installing the filler material for supporting the coil end portion at the diamond area of a dynamoelectric machine which comprises placing an elongated, transversely corrugated, longitudinally flexible, sheet-like spacer element in the vent area defined between opposed sides of spaced coil end portions at the diamond area, said element being positioned to extend along the vent area with its opposite faces disposed in generally facing relationship to the opposed sides of the coil end portions defining the vent area; thereafter injecting a liquid, curable resin filler component into said vent area in generally surrounding relationship to the spacer element; and then allowing the resin to cure while in contact with the surfaces of the spacer element while the contact between the resin and the spacer element assists in preventing the curing resin from sagging.

The invention also provides a dynamoelectric machine which comprises a stator having outwardly extending winding coil end portions at the diamond area at each end thereof, and a filler material for supporting the end portions as described.

DESCRIPTION OF THE PREFERRED EMBODIMENTS

Figure 1:
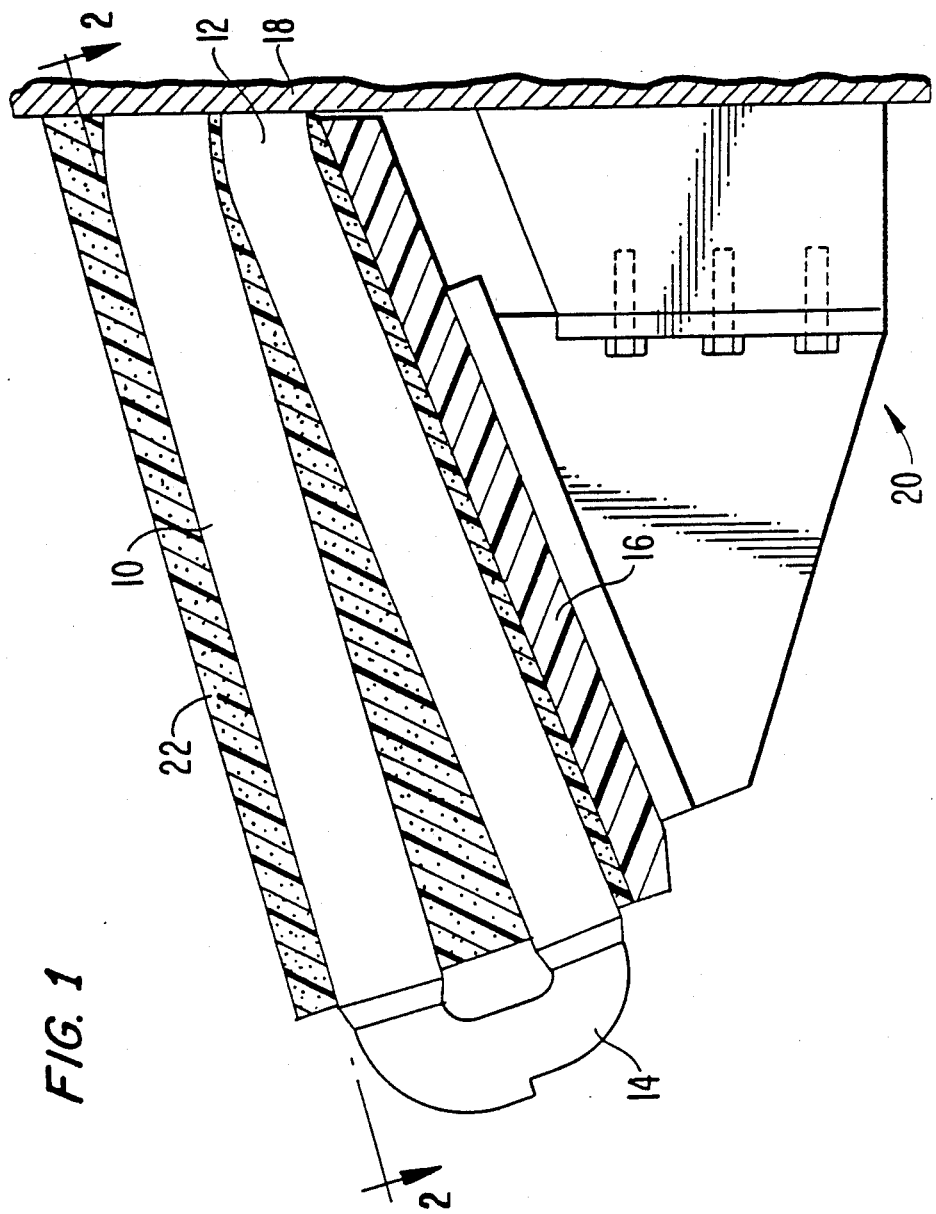
FIG. 1 is a side elevational view of a stator coil end turn assembly of a dynamoelectric machine which incorporates a support arrangement in accordance with the concepts of the present invention.

The winding coil end portions of a stator for a dynamoelectric machine, in this case a large turbine generator, are illustrated schematically in FIG. 1 where a top coil end portion is identified by the reference numeral 10, a bottom coil end portion is identified by the reference numeral 12 and a series connection for interconnecting top coil portion 10 and bottom coil portion 12 is identified by the reference numeral 14. Top portion 10 and bottom portion 12 extend outwardly from the end of the stator 18, only a small portion of which is shown.

It will be understood by those skilled in the dynamoelectric machine art that a certain amount of artistic license has been exercised in the drawings consistent with common practice in showing end turn support arrangements. The end turns actually are curved into and out of a plane through the axis of the machine rather than directly axially extending as implied by FIG. 1. The top and bottom coils normally curve in opposite directions and are joined respectively to another bottom coil and another top coil from different slots in the stator. The relative curving of the top and bottom coil end portions 10 and 12 is illustrated schematically in FIG. 2 which shows only a portion of the end turn area that actually extends angularly all the way around the machine.

As is well known to those working in the dynamoelectric machine field, stator 18 and the end portions of the coil which are conventionally referred to as the diamond area, are annular and define a bore for the rotor. In the dynamoelectric machine art, the coils which are closest to the center of rotation of the rotors are generally referred to as top coils while the coils which are furthest from the center of rotation of the rotor are generally referred to as bottom coils. Thus, FIG. 1 is a cross-sectional elevation view taken essentially at the lower end of the end turn or diamond area of the machine. But this figure is illustrative of the cross-sectional construction of the end turn area throughout its entire 360° extent. For purposes of the following disclosure, the direction up simply means radially toward the center of rotation of the rotor and the direction down means radially outwardly away from the center of rotation of the rotor.

With reference to FIG. 1, a conical member 16 is disposed in surrounding relationship relative to bottom coil end portions 12. Member 16 is preferably constructed of a fiberglass material and the same may be of a construction as described in said '243 and '079 patents. The conical member 16, as shown in FIG. 1, is located radially outside the end turns and provides a support structure that preferably has appropriate thermal expansion characteristics so that it expands in a manner which is similar to the expansion of the coil end turns that it supports. Conventional mounting structure designated broadly by the reference numeral 20 may be provided for mounting the conical member 16 on the end of the stator structure 18.

A resin filler 22 is disposed in the vent areas 24 between adjacent coil end portions 10 and 12. As shown in FIG. 1, the filler 22 is supported by cone member 16 and is disposed between adjacent coil end portions 10 and 12 as can be seen viewing FIG. 2. Such material is initially in a thixotropic, viscous, generally liquid form which gels and solidifies during curing. In its initially liquid form, the resin is often pumped into the area to be filled using known techniques. The resin cures in place.

The filler may appropriately be an epoxy, a polyester or a polyurethane resin or the like, such materials being conventionally used as potting resins for applications involving electrical machinery. Preferably, however, the resin filler 22 should be, at the time it is injected into the areas between adjacent end coil portions 10 and 12, a two component epoxy resin which is filled with a particulate material such as, for example, a silica powder, which causes the mixture to have sufficient thixotropic and viscous characteristics so that it will essentially remain in place after pumping and during curing. However, the adjustment of the thixotropic and viscosity characteristics of the resin is not without limitations, since the resin material must also set and cure properly with appropriate physical properties after curing, and such materials, even though thixotropic and viscous, often tend to sag due to their own weight after injection and during the curing stage and before curing has been completed. This is at least partially due to the fact that the curing phenomena is exothermic, and thus the overall viscosity of the curing resin may sometimes decrease to the point where the curing material is quite liquid. This problem is at least in part addressed by the present invention, as will be discussed hereinbelow.

After curing, as is known in the art, the epoxy material should preferably have a compressive strength greater than 5 KSI at room temperature and greater than 2 KSI at 90° C. Epoxy materials capable of providing such characteristics are well known.

Figure 2:
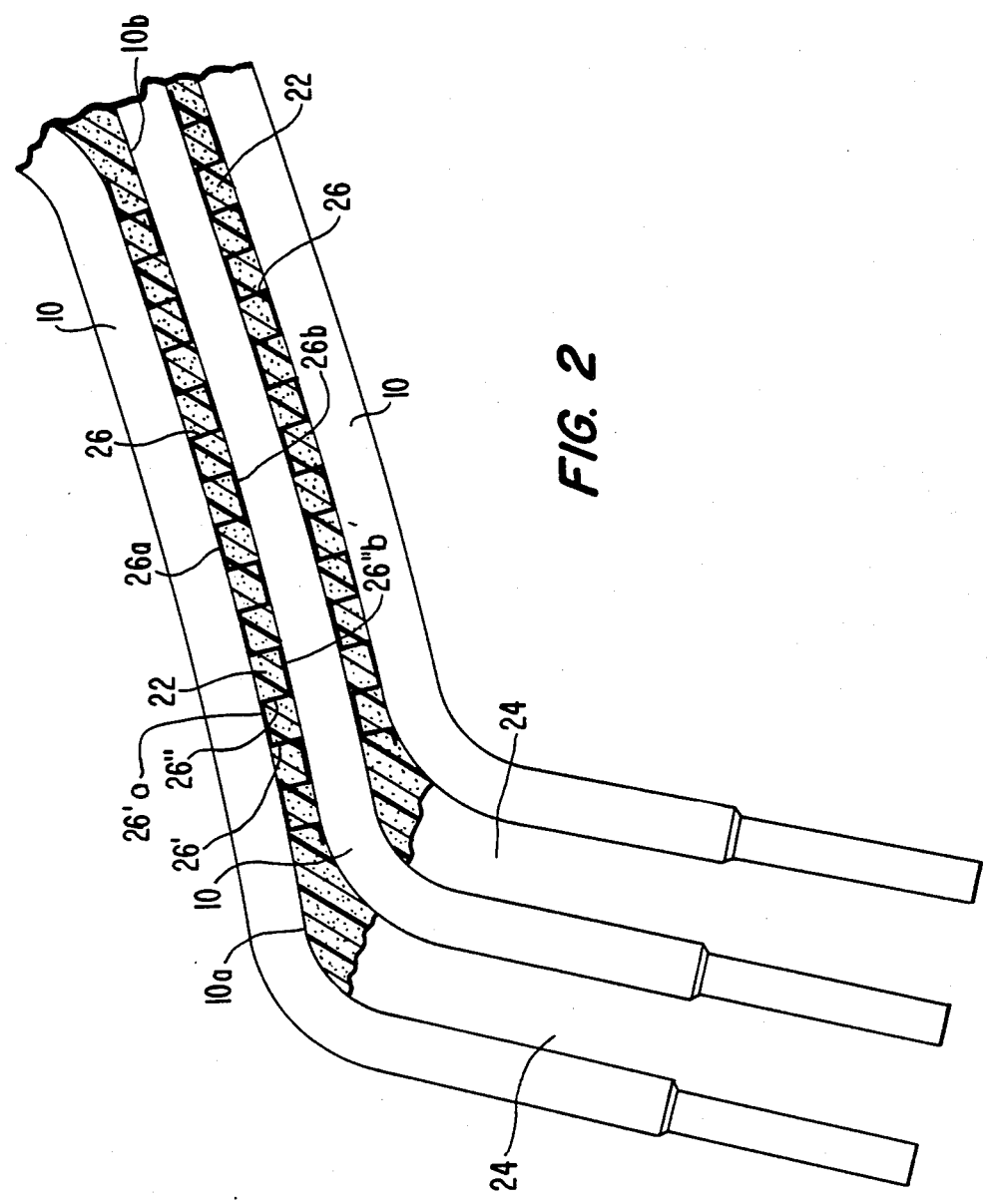
FIG. 2 is a partial cross-sectional view taken essentially along the line 2—2 of FIG. 1 to schematically illustrate the diamond area of the machine.

To alleviate the problem of sagging in the curing resin, an elongated, transversely corrugated, longitudinally flexible, sheet-like spacer element 26 is emplaced within the resin filler 22 disposed at each vent area 24 between adjacent coil end portions 10, as can best be seen in FIG. 2. Likewise, although not illustrated in the drawings, a spacer element like the spacer element 26 may be emplaced within the resin filler disposed in each vent area between adjacent lower coil end portions 12. In either case the elements 26 are positioned to extend along the respective vent areas 24 with opposite faces 26a and 26b thereof disposed in generally facing relationship to the sides 10a and 10b of the coil end portions 10 on either side of the vent area 24. As can be seen viewing FIG. 2, spacer element 26 is transversely corrugated and the corrugations 26' and 26", for example, are generally rectangular in shape. And preferably, the corrugations 26' and 26" may be essentially square, as shown in FIG. 2.

Figure 3:
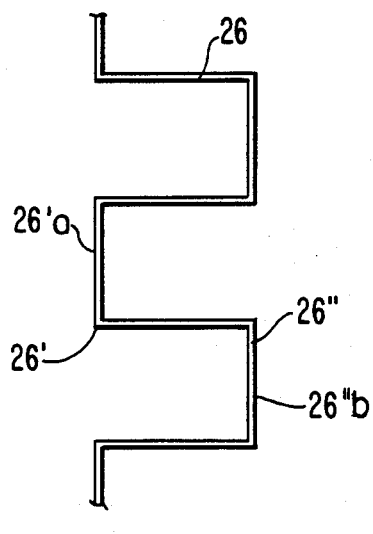
FIG. 3 is a side view of the elongated, transversely corrugated, longitudinally flexible, sheet-like spacer element of the invention.

As can be seen in FIGS. 2 and 3, spacer element 26 comprises a series of panels 26'a and 26"b which are disposed in general parallelism with respect to the sides 10a and 10b of the corresponding coil end portions 10. The panels 26'a and 26"b are alternatively arranged adjacent one of said sides, 10a or 10b and then the other. The panels 26'a and 26"b are interconnected by webs 26c which extend across the vent area 24. Manifestly, the panels 26'a taken together present face 26a of element 26, while panels 26"b taken together present face 26b of element 26.

Figure 4:
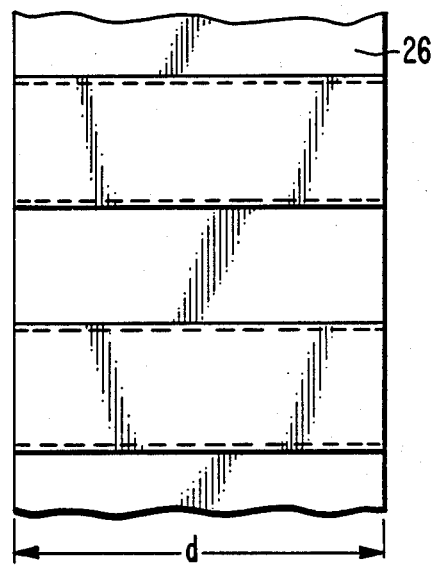
FIG. 4 is a plan view of the spacer element of FIG. 3.

Although there is no critical limitation as to the material of construction for spacer element 26, other than that it be an electrical insulator, the element preferably may be constructed of a molded, unidirectional fiberglass material. Moreover, element 26 should have a vertical dimension d, as shown in FIG. 4, which is essentially the same as the height of the adjacent coil end portions. The principal limitations on the physical dimensions and characteristics of element 26 are simply that the same should be longitudinally flexible, should have enough surface area to substantially inhibit sagging of the resin during curing, and should be operable to increase the effective stiffness of the filler material and control the linear thermal coefficient of expansion thereof after curing. Such characteristics, generally speaking, may be determined empirically.

In machines of the sort to which the present invention is directed, the lengths of the vents 24 from the outboard end of the diamond area to the stator slot is approximately 28 to 36 inches, and the vents have nominal widths of about 1 inch. As is well known to those of ordinary skill in the dynamoelectric machine art, epoxy resins useful for filling the vents between the end coil windings generally have a coefficient of thermal expansion of about 90 to $100 \times 10^{-6}$ per degree Centigrade. The coil windings themselves are orthotropic and the coefficient of thermal expansion of such items cannot be determined with any great mathematical exactitude; however, it is generally understood that epoxy resin filler materials appear to have a coefficient of thermal expansion which is approximately 4 times the coefficient of thermal expansion of the coils in a direction which is through the thickness of the latter. The general result has been that upon encountering the temperature differences experienced in the coil end windings during operation, the different expansions and contractions of the coil end windings and the filler materials often causes the resin to debond from the coil windings, thus destroying the physical integrity of the support arrangement. Manifestly, evidence of debonding is evidence of inappropriate and inefficient end winding filler materials and debonding should be avoided to the extent possible. The present invention provides means which prevent or at least inhibit such debonding.

The ability of the spacer element to increase the effective stiffness of the filler material and control the linear coefficient of expansion thereof may be adjusted by trial and error simply by changing the relative dimensions of the corrugations. Ideally, in accordance with the present invention, the elements 26 should be able to control the coefficient of thermal expansion of the overall filler material and the physical properties thereof including stiffness so that the filler material reacts in essentially the same way as the coil end windings during temperature fluctuations and operational stresses such as those resulting from vibration.

Manifestly, the spacer elements 26 also increase the total surface area contacted by the resin filler. Thus, during the initial installation of the resin filler, and at a time when the same still possess liquid characteristics, the additional contact area operates to retard sagging of the resin filler while the same goes through the curing process.

A principal objective of the present invention is to provide a method and means for reducing the amount of hand labor fit up and to reduce the time required to form the assembly of large four pole generators. To accomplish this, the present invention reduces the fit up required during the resin filler injection process. In this connection, with large generators, the resin filler will generally be injected at the job site, where rotation of the stator is not possible. Thus, the injection must take place at all clock positions, including the overhead or 12 o'clock position. Thus, the natural tendency of the resin filler to flow when applied to large spaces is a significant problem which is appropriately addressed by the present invention.

Figure 5:
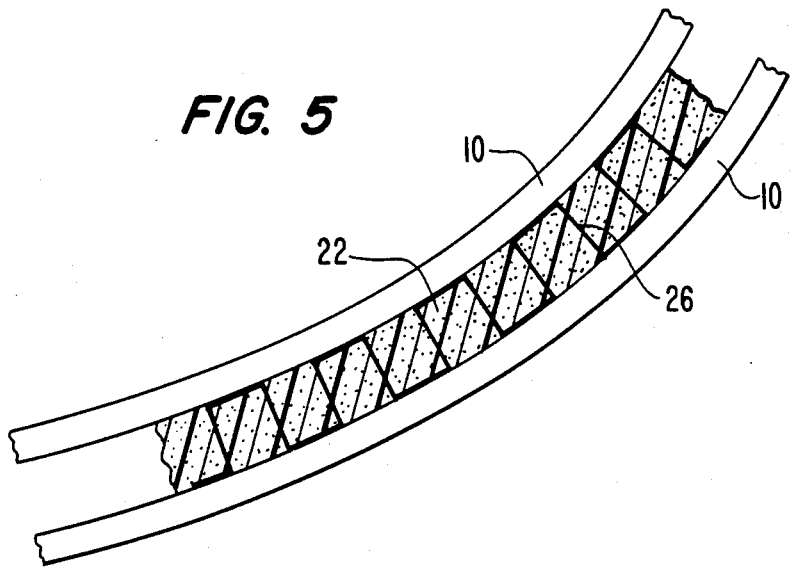
FIG. 5 is a schematic view similar to FIG. 2 and illustrating the use of the spacer element of the invention in a vent area which has a slight curvature.

An important aspect of the present invention is to increase the surface area to which the filler resin adheres while it is still in a liquid or semi-liquid state. The corrugated construction of the elongated, transversely corrugated, longitudinally flexible, sheet-like spacer element of the present invention maximizes the surface area to which the resin may adhere. In this regard, the length of the element 26 may typically be 25 inches for a four pole stator winding; however, the length generally will be sized to fit the length of the involute diamond, as shown in FIG. 2. In accordance with the invention, pieces of the element 26 may be cut to length on site or cut to predetermined lengths off site. As set forth above, the height d of element 26, as shown in FIG. 4, typically will be sized to match the height of the stator coil, which is typically approximately $3\frac{1}{2}$ to 4 inches for four pole generators. The lengths of webs 26c may typically be approximately 1 inch so as to fit into the vent space between adjacent coils. Importantly, the dimensions of element 26 do not need to be precisely determined, and the web may purposely be undersized so that the element 26 will not interfere with the coils in areas where coil to coil spacing is at a minimum. Manifestly, the spacer element 26 must have longitudinal flexibility such that curvature in coil spacing, as illustrated in FIG. 5, does not create a problem. This is necessary in view of the fact that the diamond areas of conventional generators are hand fitted and the dimensions and spacing of the end turn portions of the coils is not always precise.

The composition of element 26 is not critical and may be tailored to meet the needs of a particular design. Although the preferred material of construction is the molded, unidirectional, fiberglass composition identified above, the element 26 might also be constructed of materials such as polyester, Nomex and Kevlar. Other materials might also be utilized to meet specific design objectives.

During the construction of the filler material in accordance with the present invention, it is contemplated that the element 26 will be inserted after filling of the vent spaces has been initiated. However, this is not critical, and it is within the contemplation of the invention that element 26b be prepositioned prior to the initiation of injection. During the resin gelling stage, it might also be necessary for element 26 to be secured using a simple wiring or clamping arrangement. However, once the resin has gelled, the effects of gravity no longer pose a problem.

Because the element 26 actually is embedded and bonded to the filler, the same effectively controls the stiffness and thermal expansion properties of the filler resin. Manifestly, by tailoring the material properties of element 26, and altering its thickness and the spacing of the corrugations, the function of the overall filler material is significantly enhanced.

I claim:

1. A filler material for supporting the coil end portions at the diamond area of a stator of a dynamoelectric machine comprising:
    a resin filler disposed in the vent areas defined between opposed sides of spaced coil end portions at the diamond area; and
    an elongated, transversely corrugated, longitudinally flexible, sheet-like spacer element disposed within said filler at each vent area and positioned to extend along the respective vent area with opposite faces thereof disposed in generally facing relationship to the sides of the coil end portions on either side of the vent area, said spacer element having a sufficient surface area in contact with the filler to retard sagging of the latter during installation and curing, and providing means for increasing the effective stiffness of the filler material and for decreasing the linear thermal coefficient of expansion thereof after curing to a level closer to that of the coil end portions.

2. A filler material as set forth in claim 1, wherein the corrugations are generally rectangular in shape.

3. A filler material as set forth in claim 2, wherein the corrugations are essentially square in shape.

4. A filler material as set forth in claim 1, wherein said spacer element comprises a series of panels disposed in general parallelism to the sides of the corresponding coil end portions, said panels being alternatively arranged adjacent one of said sides and then the other and being interconnected by webs extending across said vent area.

5. A filler material as set forth in claim 1, wherein said resin filler comprises an epoxy resin.

6. A filler material as set forth in claim 1, wherein said spacer element is constructed of a molded, unidirectional fiberglass material.

7. A filler material as set forth in claim 5, wherein said spacer element is constructed of a molded, unidirectional fiberglass material.

8. A filler material as set forth in claim 7, wherein said spacer element comprises a series of panels disposed in general parallelism to the sides of the corresponding coil end portions, said panels being alternatively arranged adjacent one of said sides and then the other and being interconnected by webs extending across said vent area.

9. A filler material as set forth in claim 1, wherein said spacer element has a vertical dimension that is essentially the same as the height of the coil end portions.

10. A filler material as set forth in claim 4, wherein said spacer element has a vertical dimension that is essentially the same as the height of the coil end portions.

11. A filler material as set forth in claim 8, wherein said spacer element has a vertical dimension that is essentially the same as the height of the coil end portions.

12. A dynamoelectric machine comprising a stator having outwardly extending winding coil end portions at the diamond area at each end thereof, and a filler material for supporting said end portions, said filler material comprising:
    an epoxy resin filler disposed in the vent areas defined between opposed sides of spaced coil end portions at the diamond area; and
    an elongated, transversely corrugated, longitudinally flexible, sheet-like spacer element disposed within said filler at each vent area and positioned to extend along the respective vent area with opposite faces thereof disposed in generally facing relationship to the sides of the coil end portions on either side of the vent area, said spacer element having a sufficient surface area in contact with the filler to retard sagging of the latter during installation and curing, and providing means for increasing the effective stiffness of the filler material and for decreasing the linear thermal coefficient of expansion thereof after curing to a level closer to that of the coil end portions.

13. A dynamoelectric machine as set forth in claim 12, wherein said spacer element is constructed of a molded unidirectional fiberglass material.

14. A dynamoelectric machine as set forth in claim 13, wherein said spacer element comprises a series of panels disposed in general parallelism to the sides of the corresponding coil end portions, said panels being alternatively arranged adjacent one of said sides and then the other and being interconnected by webs extending across said vent area.

15. A dynamoelectric machine as set forth in claim 14, wherein said spacer element has a vertical dimension that is essentially the same as the height of the coil end portions.

* * * * *